(12) United States Patent
Hatano

(10) Patent No.: US 11,872,641 B2
(45) Date of Patent: Jan. 16, 2024

(54) DRILL AND METHOD FOR MANUFACTURING MACHINED PRODUCT

(71) Applicant: KYOCERA CORPORATION, Kyoto (JP)

(72) Inventor: Hirokazu Hatano, Otsu (JP)

(73) Assignee: KYOCERA Corporation, Kyoto (JP)

( * ) Notice: Subject to any disclaimer, the term of this patent is extended or adjusted under 35 U.S.C. 154(b) by 424 days.

(21) Appl. No.: 16/618,166

(22) PCT Filed: May 21, 2018

(86) PCT No.: PCT/JP2018/019539
§ 371 (c)(1),
(2) Date: Nov. 29, 2019

(87) PCT Pub. No.: WO2018/221303
PCT Pub. Date: Dec. 6, 2018

(65) Prior Publication Data
US 2020/0391304 A1    Dec. 17, 2020

(30) Foreign Application Priority Data

May 29, 2017 (JP) ................................. 2017-105777

(51) Int. Cl.
*B23B 51/02* (2006.01)
*B23B 35/00* (2006.01)
*B23B 27/16* (2006.01)

(52) U.S. Cl.
CPC ............. *B23B 51/02* (2013.01); *B23B 35/00* (2013.01); *B23B 27/16* (2013.01); *B23B 2251/241* (2013.01)

(58) Field of Classification Search
CPC ......... B23B 51/02; B23B 27/16; B23B 35/00; B23B 2251/02; B23B 2251/241; B23B 2251/406; B23B 2251/40
See application file for complete search history.

(56) References Cited

U.S. PATENT DOCUMENTS 1,384,733 A * 7/1921 Woods .................... B23B 51/02
    408/56
2,193,186 A * 3/1940 Bannister ................ B23B 51/02
    408/223

(Continued)

FOREIGN PATENT DOCUMENTS

CN     102632277 A     8/2012
DE     10337203 A1     3/2005
(Continued)

*Primary Examiner* — Nicole N Ramos
(74) *Attorney, Agent, or Firm* — VIERING, JENTSCHURA & PARTNER MBB

(57) ABSTRACT

A drill may include a main body having a bar shape extending from a first end to a second end. The main body may be rotatable around a rotation axis. The main body may include a cutting edge, a first flute extending from the cutting edge, and a second flute extending from the first flute. The first flute may include, in a cross section orthogonal to the rotation axis, a first portion having a concave curvilinear shape located at a rear side in a rotation direction, and a second portion having a convex curvilinear shape located at a front side in the rotation direction. The second flute has a concave curvilinear shape from an end portion located at a front side in the rotation direction to an end portion located at a rear side in the rotation direction in the cross section.

20 Claims, 14 Drawing Sheets

(56) References Cited

U.S. PATENT DOCUMENTS

| | | | | |
|---|---|---|---|---|
| 4,975,003 | A * | 12/1990 | Hosoi | B23B 51/02 408/230 |
| 5,160,232 | A * | 11/1992 | Maier | B23B 51/02 407/54 |
| 5,716,172 | A * | 2/1998 | Nakamura | B23B 51/02 408/230 |
| 9,039,336 | B2 * | 5/2015 | Von Puttkamer | B24B 19/04 408/230 |
| 9,248,512 | B2 * | 2/2016 | Aare | B23B 51/02 |
| 2005/0053439 | A1 * | 3/2005 | Wang | B23B 51/02 408/230 |
| 2006/0198708 | A1 | 9/2006 | Krenzer et al. | |
| 2008/0298918 | A1 * | 12/2008 | Brink | B23B 51/02 408/230 |
| 2010/0092259 | A1 * | 4/2010 | Borschert | B23B 51/02 408/230 |
| 2012/0201619 | A1 | 8/2012 | Olsson | |
| 2013/0170920 | A1 * | 7/2013 | Ogawa | B23B 51/02 408/230 |
| 2014/0219737 | A1 | 8/2014 | Takai et al. | |
| 2015/0328693 | A1 * | 11/2015 | Koga | B23B 51/02 408/1 BD |
| 2017/0326652 | A1 | 11/2017 | Koga et al. | |

FOREIGN PATENT DOCUMENTS

| | | |
|---|---|---|
| JP | S61-141007 U | 9/1986 |
| JP | S63-318208 A | 12/1988 |
| JP | H04-060606 U | 5/1992 |
| JP | H05-24218 U | 3/1993 |
| JP | 2001096413 A | 4/2001 |
| JP | 2016064477 A | 4/2016 |
| SU | 774824 A1 * | 10/1980 |
| WO | 2013035166 A1 | 3/2013 |
| WO | 2016080305 A1 | 5/2016 |

* cited by examiner

DRILL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/019539 filed on May 21, 2018, which claims priority to Japanese Application No. 2017-105777 filed on May 29, 2017, which are entirely incorporated herein by reference.

TECHNICAL FIELD

The present disclosure relates to drills for use in a drilling process or the like, and a method for manufacturing a machined product.

BACKGROUND

As a drill for use in the drilling process or the like of a workpiece, such as metals, a drill has been discussed in Japanese Unexamined Patent Publication No. 63-318208 (Patent Document 1). The drill discussed in Patent Document 1 may include a cutting edge formed on a front edge of a tool main body, and a twisted flute formed on an outer periphery of the tool main body. The twisted flute may include a convex curved surface located on a front side in a rotation direction, a concave curved surface located on a rear side in the rotation direction, and a concave flute located between the convex curved surface and the concave curved surface in a cross section orthogonal to a rotation axis. If the twisted flute includes the convex curved surface, chips may be curled stably at a small radius of curvature.

If the convex curved surface is made small in the drill described in Patent Document 1, it is difficult to curl chips at a small radius of curvature on a front end side. If the convex curved surface is made large, chip discharge performance may be lowered on a rear end side due to a narrow space for the twisted flute.

In particular, chip flow speed becomes lower as separating from the front end at which the cutting edge is located in a direction along the rotation axis. Chip clogging may occur at a portion of the twisted groove which is located away from the cutting edge.

SUMMARY

A drill in a non-limiting embodiment may include a main body having a bar shape extending from a first end to a second end. The main body may be rotatable around a rotation axis. The main body may include a cutting edge located at a side of the first end, a first flute extending from the cutting edge toward the second end, and a second flute extending from the first flute toward the second end. The first flute may include, in a cross section orthogonal to the rotation axis, a first portion having a concave curvilinear shape located on a more rear side in a rotation direction of the rotation axis than a bottom of the first flute, and a second portion having a convex curvilinear shape located on a more front side in the rotation direction than the bottom. The second flute has a concave curvilinear shape in a range from an end portion located on a front side in the rotation direction to an end portion located on a rear side in the rotation direction in the cross section orthogonal to the rotation axis.

DETAILED DESCRIPTION

Figure 1:
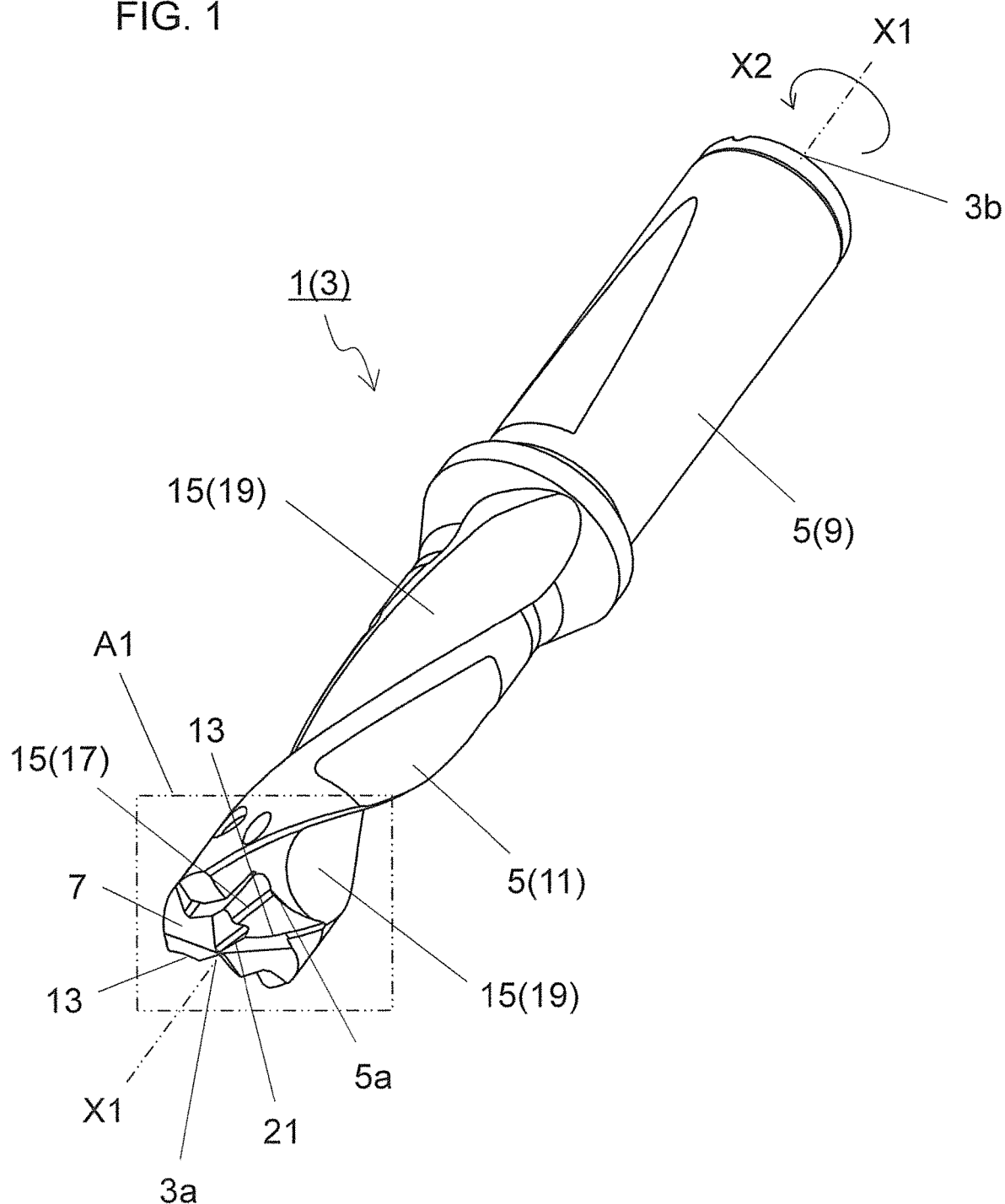
FIG. 1 is a perspective view illustrating a drill in a non-limiting embodiment.

A rotary tool in a non-limiting embodiment is described in detail below with reference to the drawings. For the sake of description, the drawings referred to in the following illustrate, in a simplified form, only main members for describing the various non-limiting embodiments. The rotary tools are therefore capable of including any arbitrary structural member not illustrated in the drawings referred to in the present specification. Sizes of the members in each of the drawings faithfully represent neither sizes of actual structural members nor size ratios of these members.

<Drill>

Examples of the rotary tool may include drills. The rotary tool illustrated in FIG. 1 is the drill 1. Examples of the rotary tool also may include end mills besides the drills. Therefore, the drill 1 may be replaced with the rotary tool in the following description.

For example, as illustrated in FIG. 1, the rotary tool (drill 1) in the non-limiting embodiment may include a bar-shaped main body 3 rotatable around a rotation axis X1. The main body 3 may extend from a first end 3a to a second end 3b. The drill 1 may be rotatable around the rotation axis X1 during a process of cutting out a workpiece for manufacturing a machined product. An arrow X2 in FIG. 1 and the like may indicate a rotation direction of the drill 1.

The main body 3 may be composed of one or a plurality of members. The main body 3 illustrated in FIG. 1 may include, for example, two members of at least a holder 5 and an insert 7. The holder 5 may include, for example, a bar shape extending long and narrow along the rotation axis X1 as illustrated in FIG. 1, and may include a pocket 5a located at a side of the first end 3a. The holder 5 may include a pocket 5a, and the insert 7 may be located in the pocket 5a in the non-limiting embodiment illustrated in FIG. 1.

The pocket 5a may be a part that permits attachment of the insert 7 and opens into a side of the first end 3a of the holder 5. The insert 7 may be located in the pocket 5a in the non-limiting embodiment illustrated in FIG. 1. The insert 7 may be in direct contact with the pocket 5a or, alternatively, a sheet not particularly illustrated may be configured to be held between the insert 7 and the pocket 5a. The insert 7 may be attachable to and detachable from the holder 5.

If the main body 3 is composed of the holder 5 and the insert 7 as in the non-limiting embodiment illustrated in FIG. 1, the drill 1 is generally called "an edge replaceable drill." If the main body 3 is composed of a single member, the drill 1 is generally called "a solid drill."

The holder 5 may have the bar shape extending along the rotation axis X1 and may include the pocket 5a that permits attachment of the insert 7 in the non-limiting embodiment illustrated in FIG. 1. The holder 5 may be intended to be held by, for example, a rotatable spindle of a machine tool. Alternatively, the holder 5 may include a part called a shank 9, and a part called a body 11 located closer to the first end 3a than the shank 9.

The main body 3 may include a cutting edge 13 located at a side of the first end 3a, and a flute 15 extending from the cutting edge 13 toward the second end 3b in the non-limiting embodiment illustrated in FIG. 1. Specifically, the flute 15 may extend spirally around the rotation axis X1 from the cutting edge 13 toward the second end 3b. The flute 15 may include a first flute 17 extending from the cutting edge 13 toward the second end 3b, and a second flute 19 extending from the first flute 17 toward the second end 3b in the non-limiting embodiment illustrated in FIG. 1. A part formed in the insert 7 of the main body 3 may be referred to as the first flute 17, and a part formed in the holder 5 of the main body 3 may be referred to as the second flute 19 in the non-limiting embodiment illustrated in FIG. 1.

The main body 3 may include only one or a plurality of cutting edges 13. The main body 3 may include two cutting edges 13 in the non-limiting embodiment illustrated in FIG. 2. Shapes and positions of the two cutting edges 13 are not particularly limited. For example, the two cutting edges 13 may be in the shape of 180° rotational symmetry relative to the rotation axis X1 if viewed from a side of the first end 3a.

Figure 3:
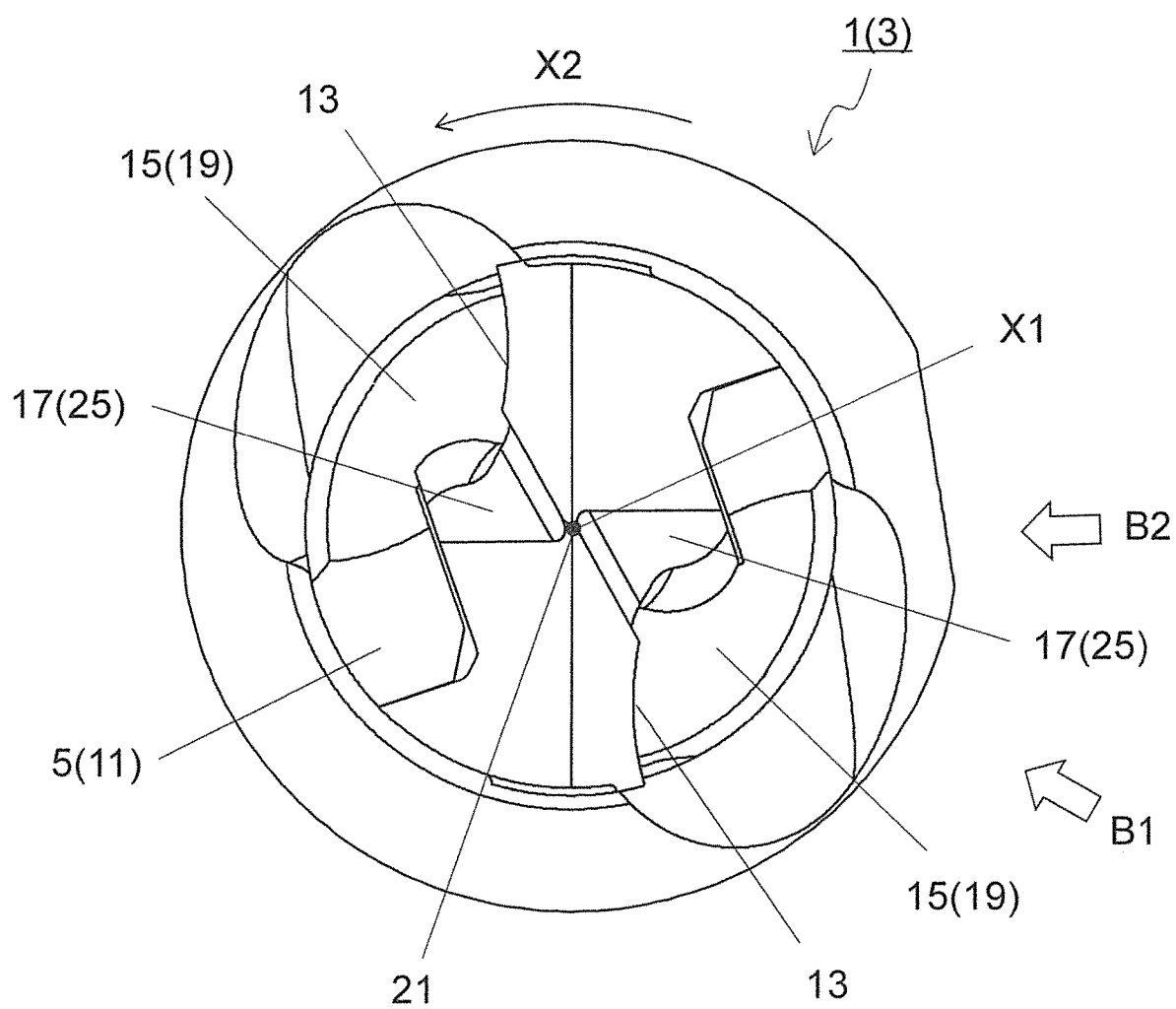
FIG. 3 is a front view when the drill illustrated in FIG. 1 is viewed from a side of a first end.
Figure 4:
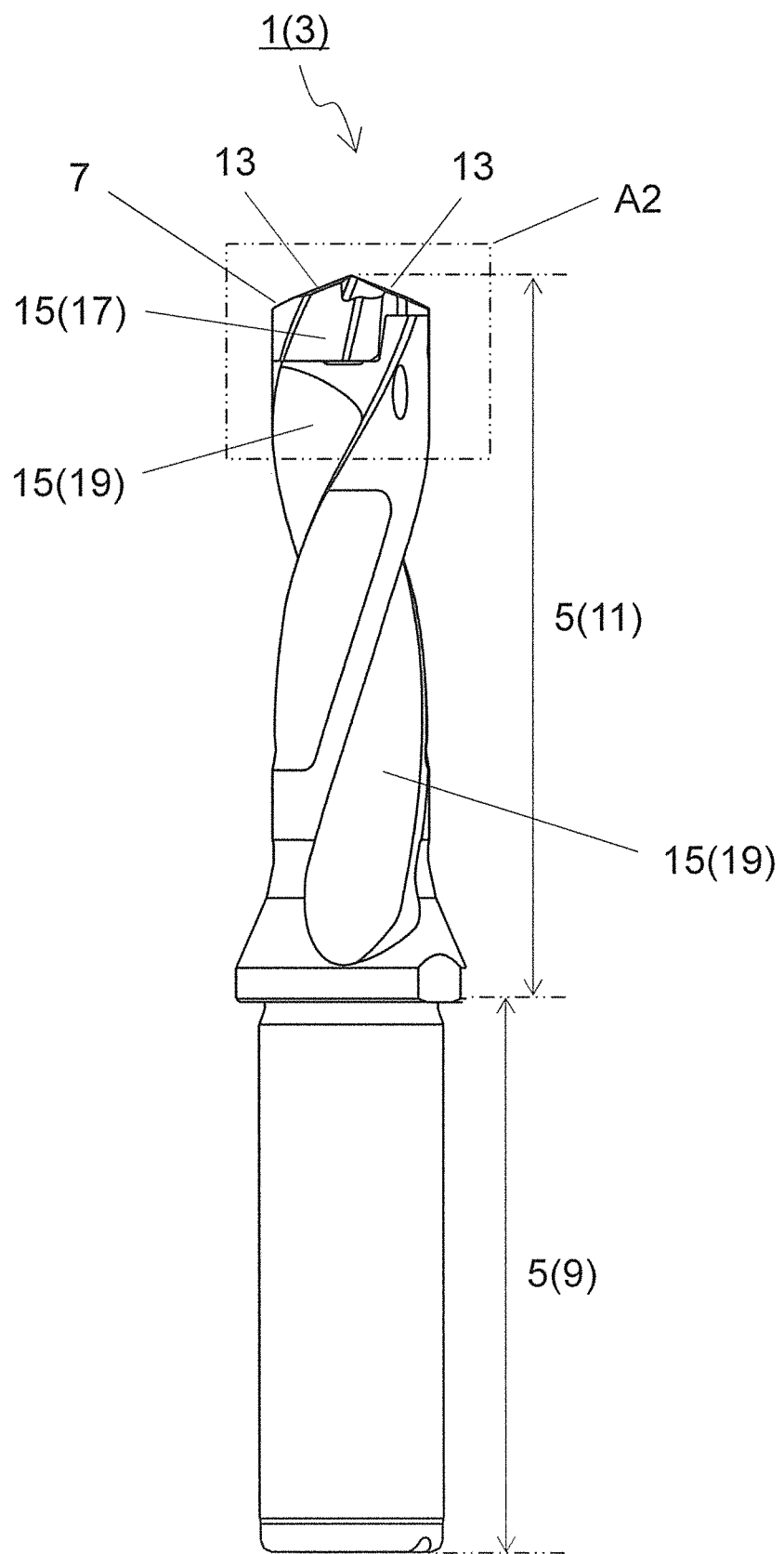
FIG. 4 is a side view when the drill illustrated in FIG. 3 is viewed from a B1 direction.
Figure 5:
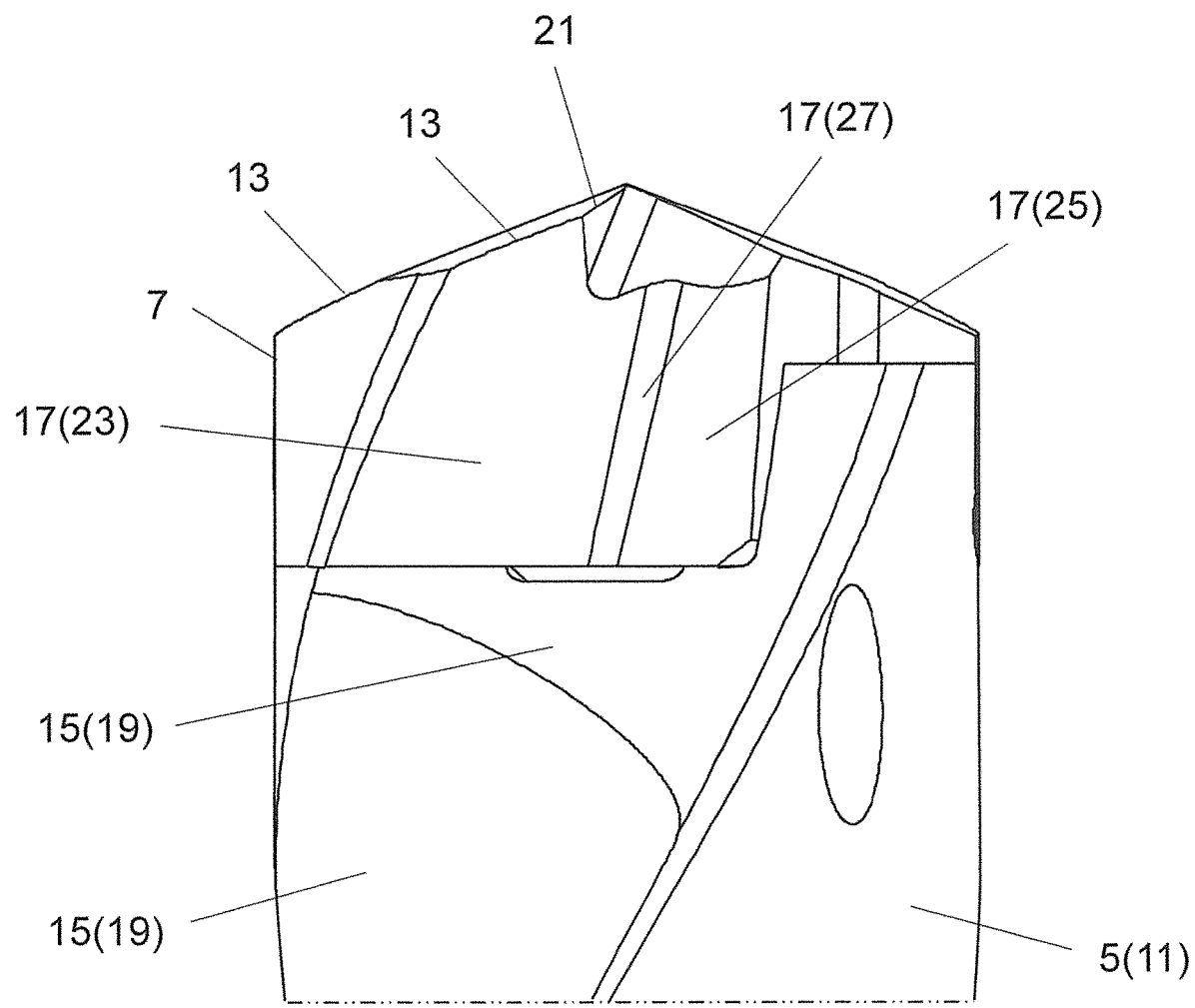
FIG. 5 is an enlarged view of a region A2 illustrated in FIG. 4.
Figure 6:
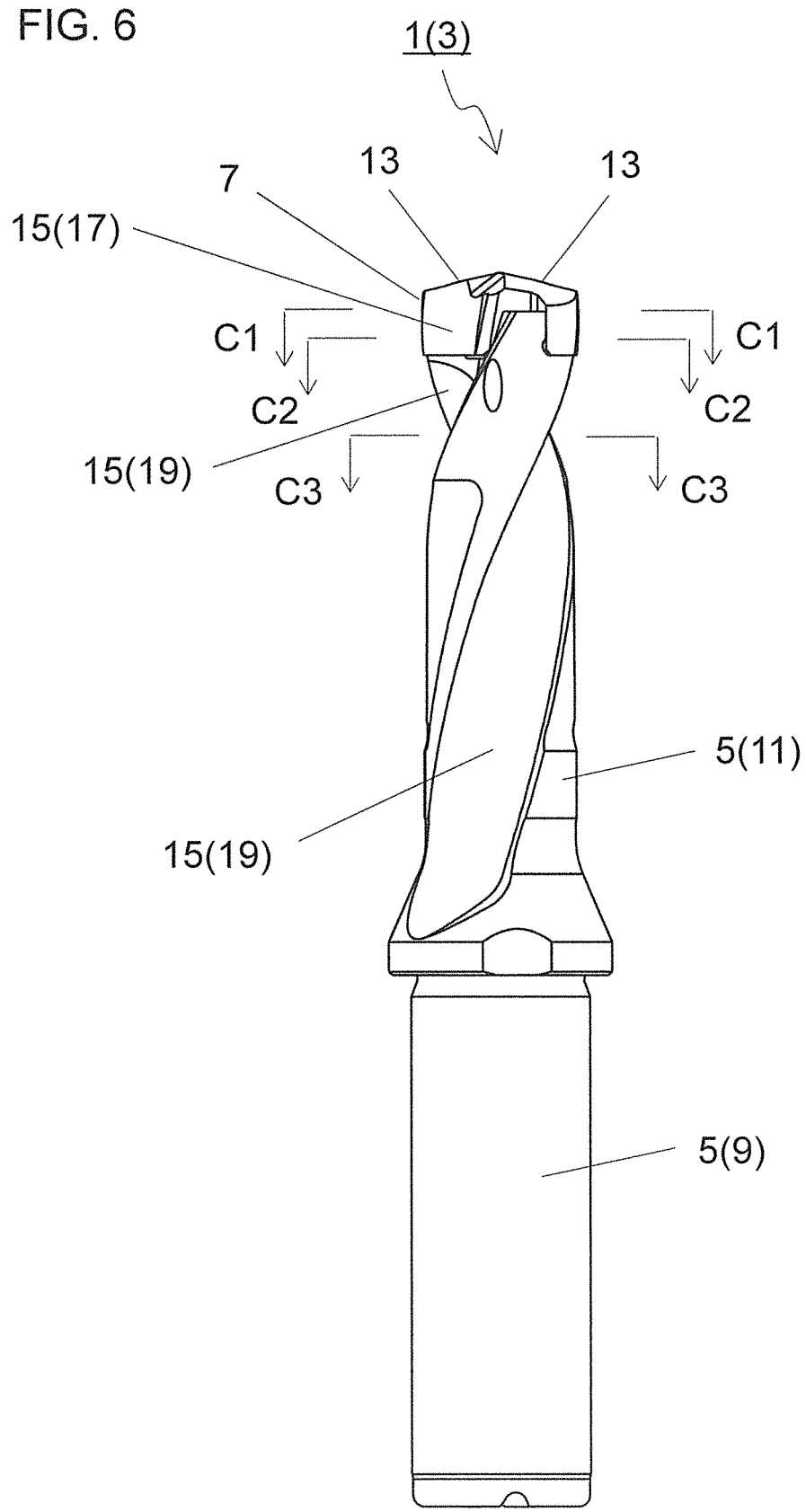
FIG. 6 is a side view when the drill illustrated in FIG. 3 is viewed from a B2 direction.

Alternatively, the two cutting edges 13 may connect directly to each other or may connect to each other by interposing therebetween an edge 21 called a chisel edge as illustrated in FIG. 3.

Figure 2:
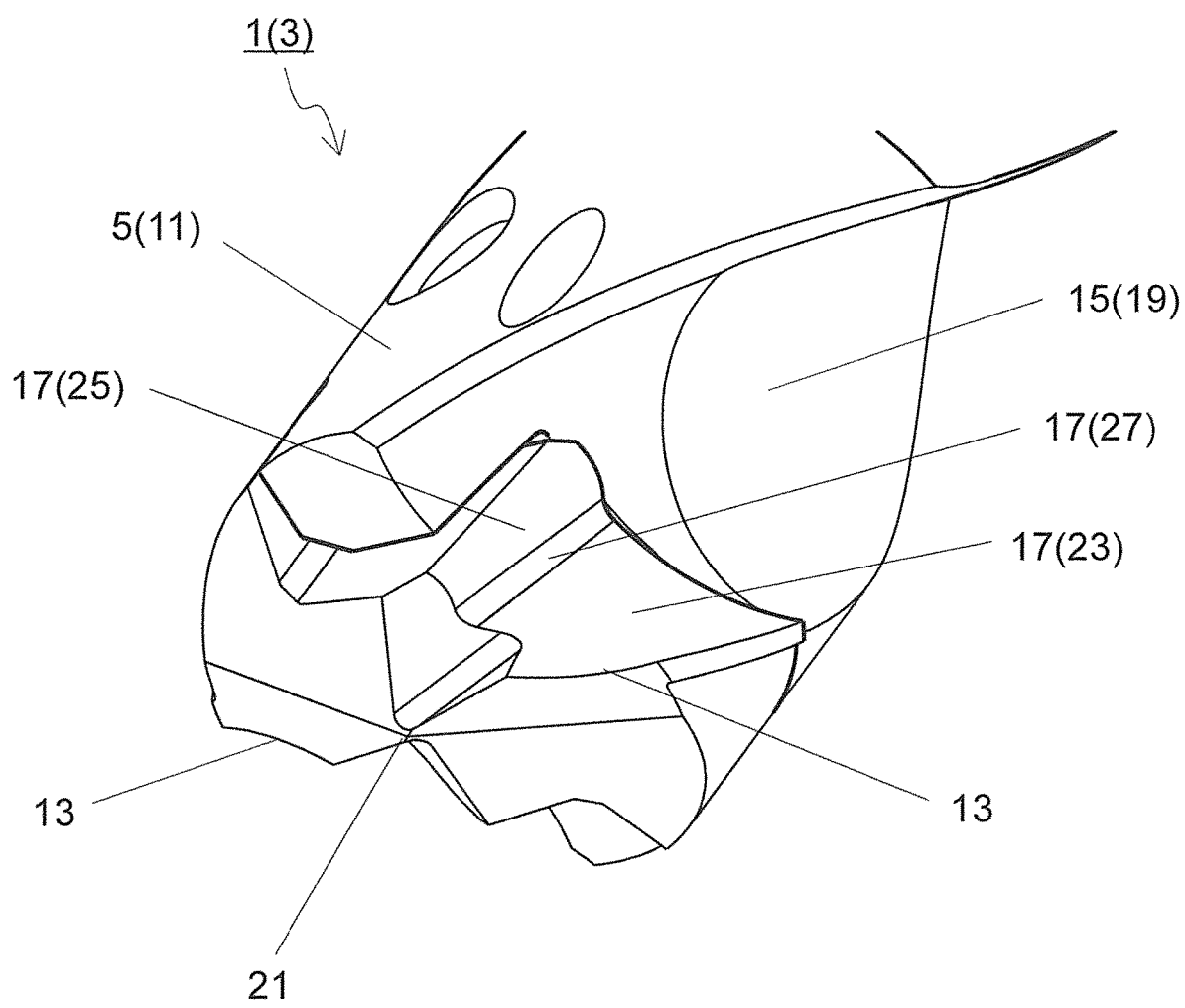
FIG. 2 is an enlarged view of a region A1 illustrated in FIG. 1.

The main body 3 may include two flutes 15 because the main body 3 includes the two cutting edges 13 in the non-limiting embodiment illustrated in FIG. 2. Each of the two flutes 15 may include the first flute 17 and the second flute 19. The flutes 15 may be used for discharging chips generated by the cutting edge 13 to the outside. The two flutes 15 may be individually formed in the body 11 in the holder 5 but not formed in the shank 9. The main body 3 can therefore be held stably by the machine tool.

An outer diameter D of the body 11 (main body 3) is not limited to a specific value. The outer diameter D may be set to, for example, 6-42.5 mm. A length L of the drill 1 in a direction along the rotation axis X1 may be set to L=2D to L=12D.

A depth of each of the two flutes 15 in the main body 3 may be set to approximately 10-40% of the outer diameter D of the body 11. Here, the depth of the flute 15 may denote a value obtained by subtracting a distance between a bottom of the flute 15 and the rotation axis X1 from a radius of the body 11 in a cross section orthogonal to the rotation axis X1. Accordingly, a diameter of a web thickness, which is indicated by a diameter of an inscribed circle about the rotation axis X1 in the cross section orthogonal to the rotation axis X1 in the body 11, may be set to approximately 20-80% of the outer diameter D of the body 11. Specifically, for example, if the outer diameter D of the body 11 is 20 mm, the depth of the flute 15 may be set to approximately 2-8 mm.

Figure 9:
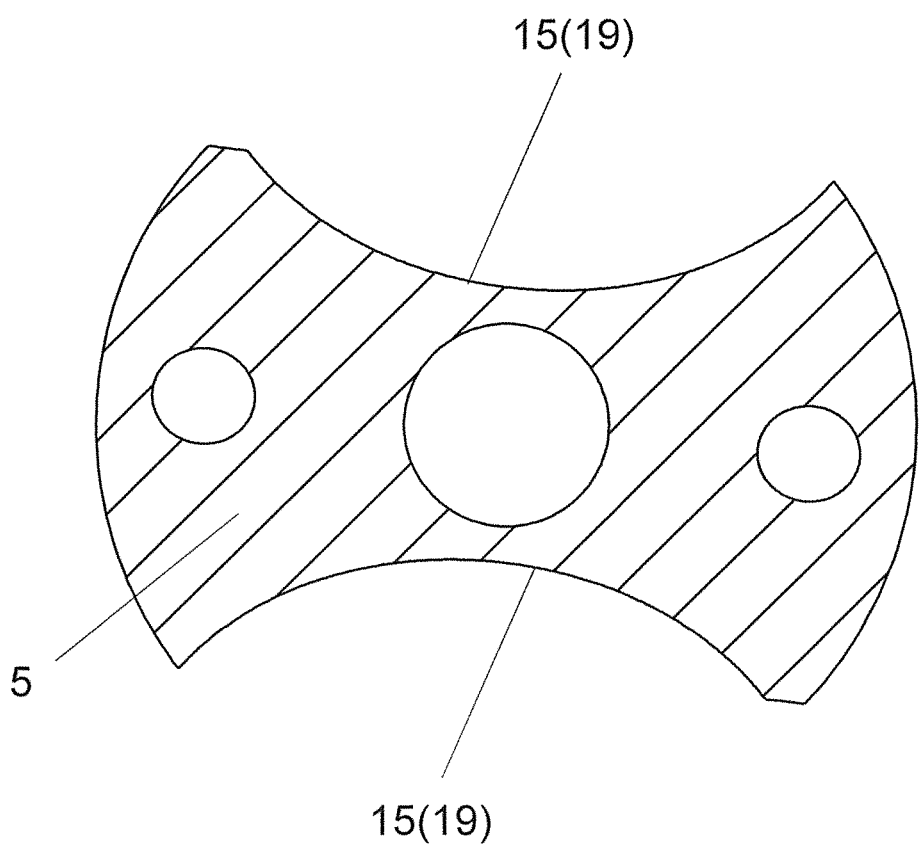
FIG. 9 is a sectional view taken along line C3-C3 in the drill illustrated in FIG. 6.

The second flute 19 in the non-limiting embodiment illustrated in FIG. 9 may have a concave curvilinear shape from an end portion located on a front side in a rotation direction X2 to an end portion located on a rear side in the rotation direction X2 in the cross section orthogonal to the rotation axis X1. Examples of the shape of the second flute 19 in the cross section orthogonal to the rotation axis X1 may include circular arcs, elliptic arcs and parabolas. The shape of the second flute 19 in the above cross section is not particularly limited but may be a circular arc shape in the non-limiting embodiment illustrated in FIG. 9.

The end portion located on the front side in the rotation direction X2 and the end portion located on the rear side in the rotation direction X2 as described above are not strictly limited to the end portions of the second flute 19. For example, a chamfering process for the purpose of improving the durability of the main body 3 may be applied to a boundary part between an outer peripheral surface of the main body 3 and the flute 15, an end portion in a region except for a surface subjected to the chamfering process in the second flute 19 may be evaluated as the above-mentioned end portions.

Figure 7:
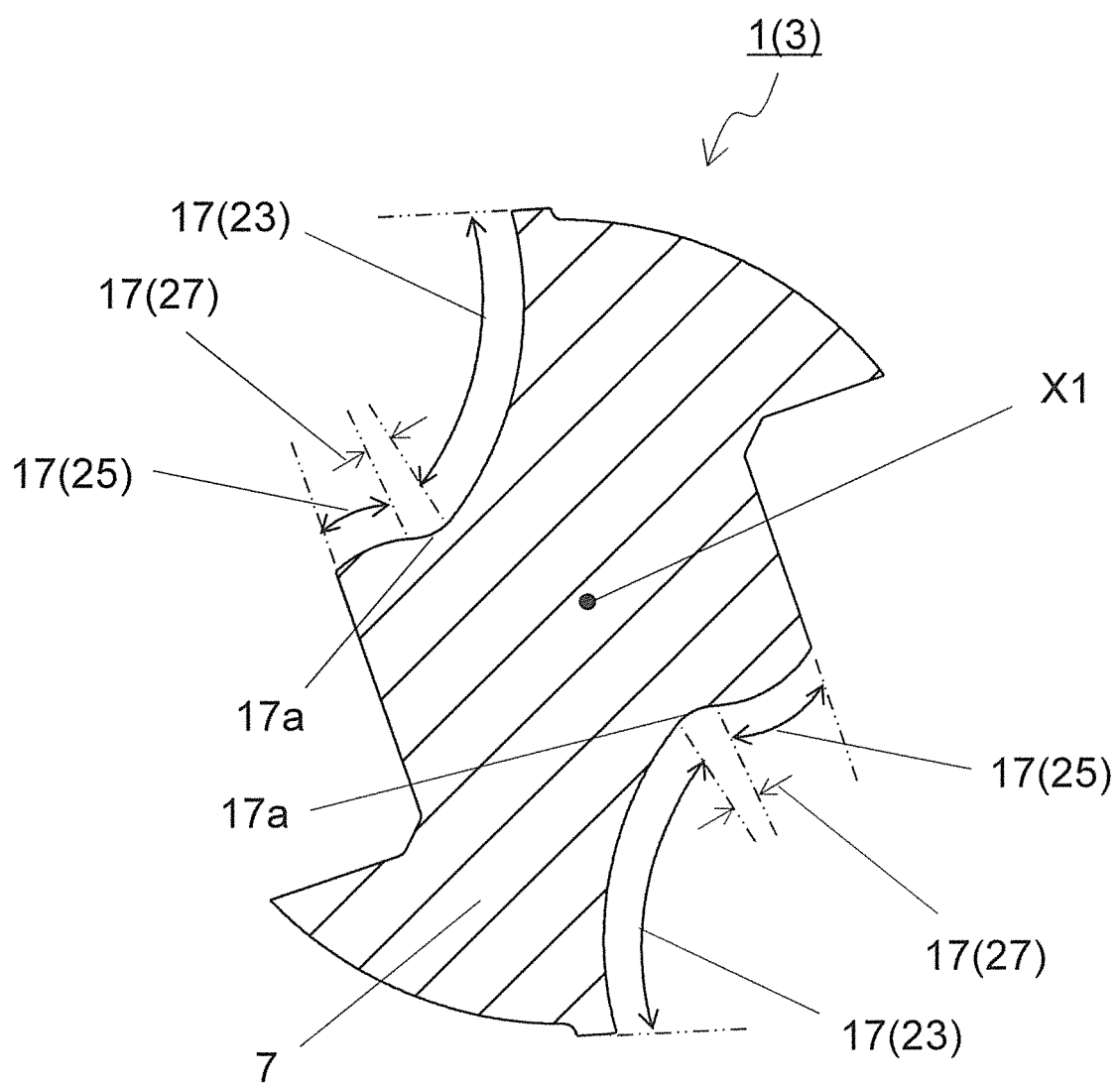
FIG. 7 is a sectional view taken along line C1-C1 in the drill illustrated in FIG. 6.
Figure 8:
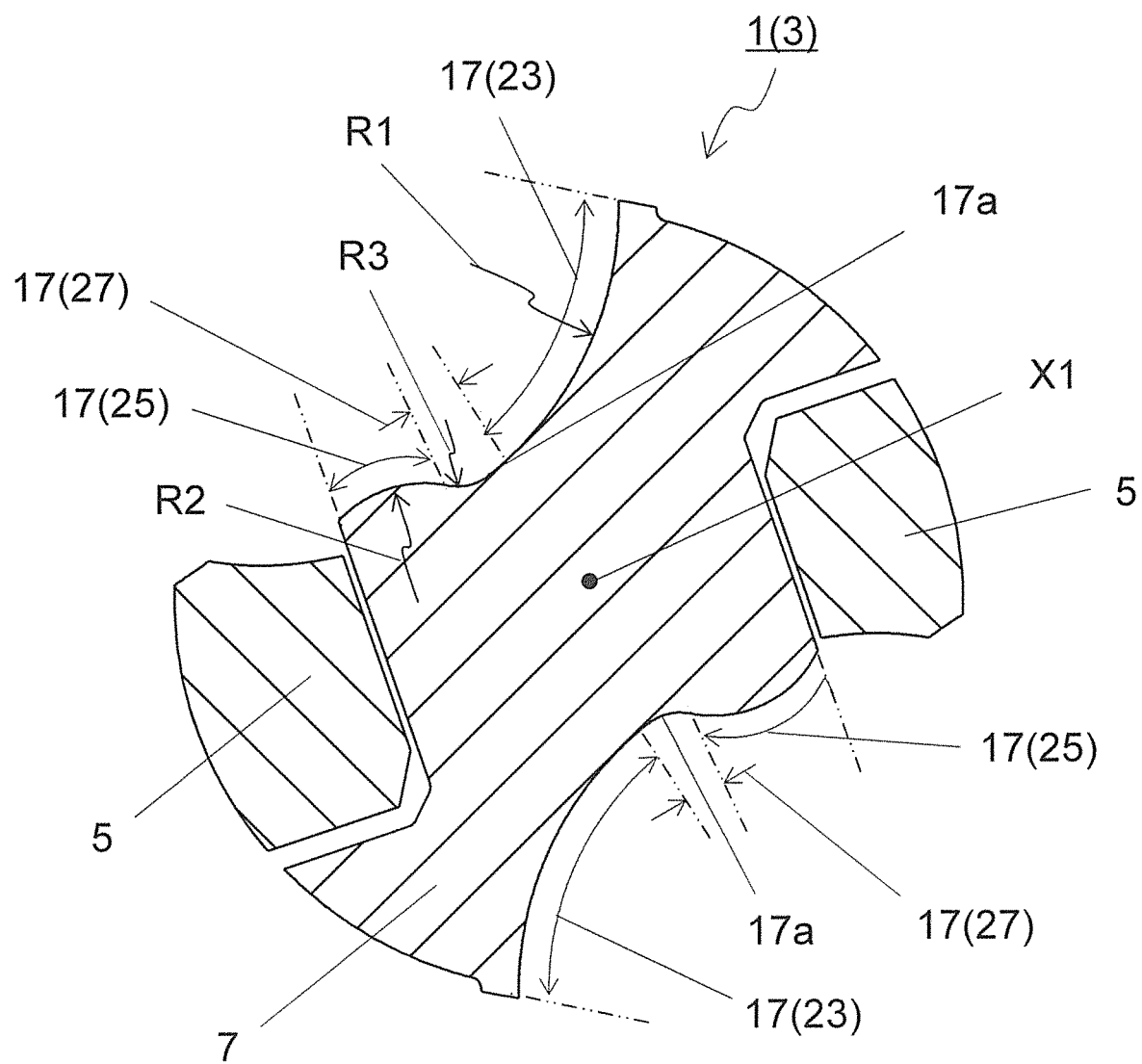
FIG. 8 is a sectional view taken along line C2-C2 in the drill illustrated in FIG. 6.

In the non-limiting embodiment illustrated in FIGS. 7 and 8, the first flute 17 may include a first portion 23 having a concave curvilinear shape and a second portion 25 having a convex curvilinear shape in a cross section orthogonal to the rotation axis X1. The first portion 23 may be located on a more rear side in the rotation direction X2 of the rotation axis X1 than a bottom 17a of the first flute 17. The second portion 25 may be located on a more front side in the rotation direction X2 than the bottom 17a. The bottom 17a may denote a portion of the first flute 17 whose distance from the rotation axis X1 is shortest in the cross section orthogonal to the rotation axis X1.

With the drill 1 in the non-limiting embodiment illustrated in FIGS. 7 and 8, because the first flute 17 includes the above configuration, chips can be curled at a small radius of curvature by bringing the chips into contact with the second portion 25, and the flute 15 may be therefore less susceptible to damage. A chip discharge direction may tend to become stable because the chips are curlable at the small radius of curvature in the first flute 17 located relatively closer to the cutting edge 13.

Additionally, the second flute 19 may include the above configuration and may not include the portion in the convex curvilinear shape in the drill 1 of the non-limiting embodiment illustrated in FIG. 9. This may make it easier to ensure a large space for the second flute 19. Chips may flow easily even in the second flute 19 located relatively far away from the cutting edge 13. Consequently, chip clogging may be less likely to occur and good chip discharge performance can be ensured.

Although the shapes of the first flute 17 and the second flute 19 may be evaluated in the cross section orthogonal to the rotation axis X1, the main body 3 need not necessarily be cut out. By scanning a surface shape of the main body 3, a cross section orthogonal to the rotation axis X1 may be evaluated imaginarily from data obtained from the scanning.

As described earlier, the part of the flute 15 which is formed on the insert 7 in the main body 3 may correspond to the first flute 17, and the part formed on the holder 5 in the main body 3 may correspond to the second flute 19 in the non-limiting embodiment illustrated in FIG. 1. However, the positions of the first flute 17 and the second flute 19 are not limited to the above arrangement.

Figure 10:
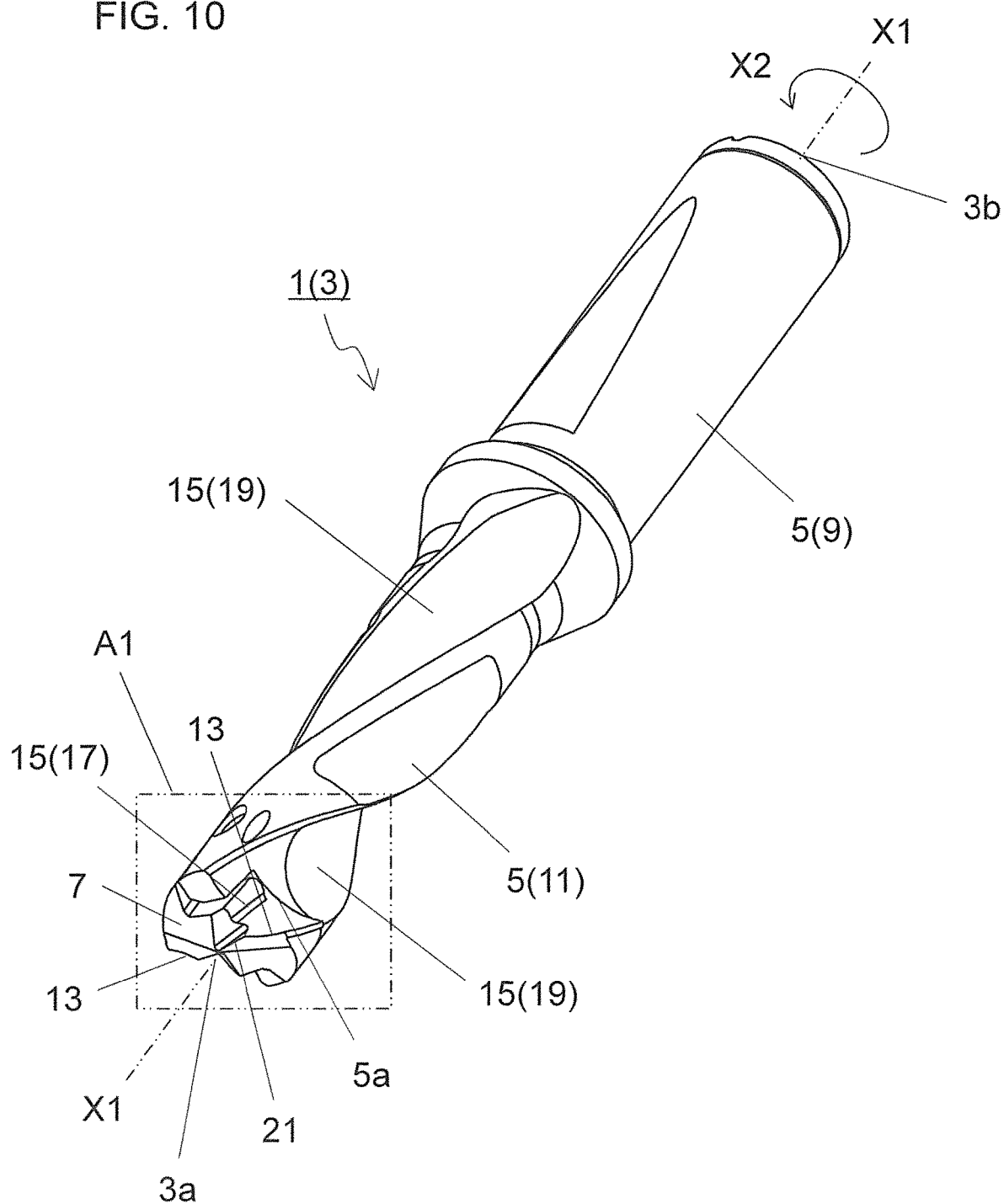
FIG. 10 is a perspective view of a non-limiting first modified embodiment of the drill illustrated in FIG. 1.
Figure 11:
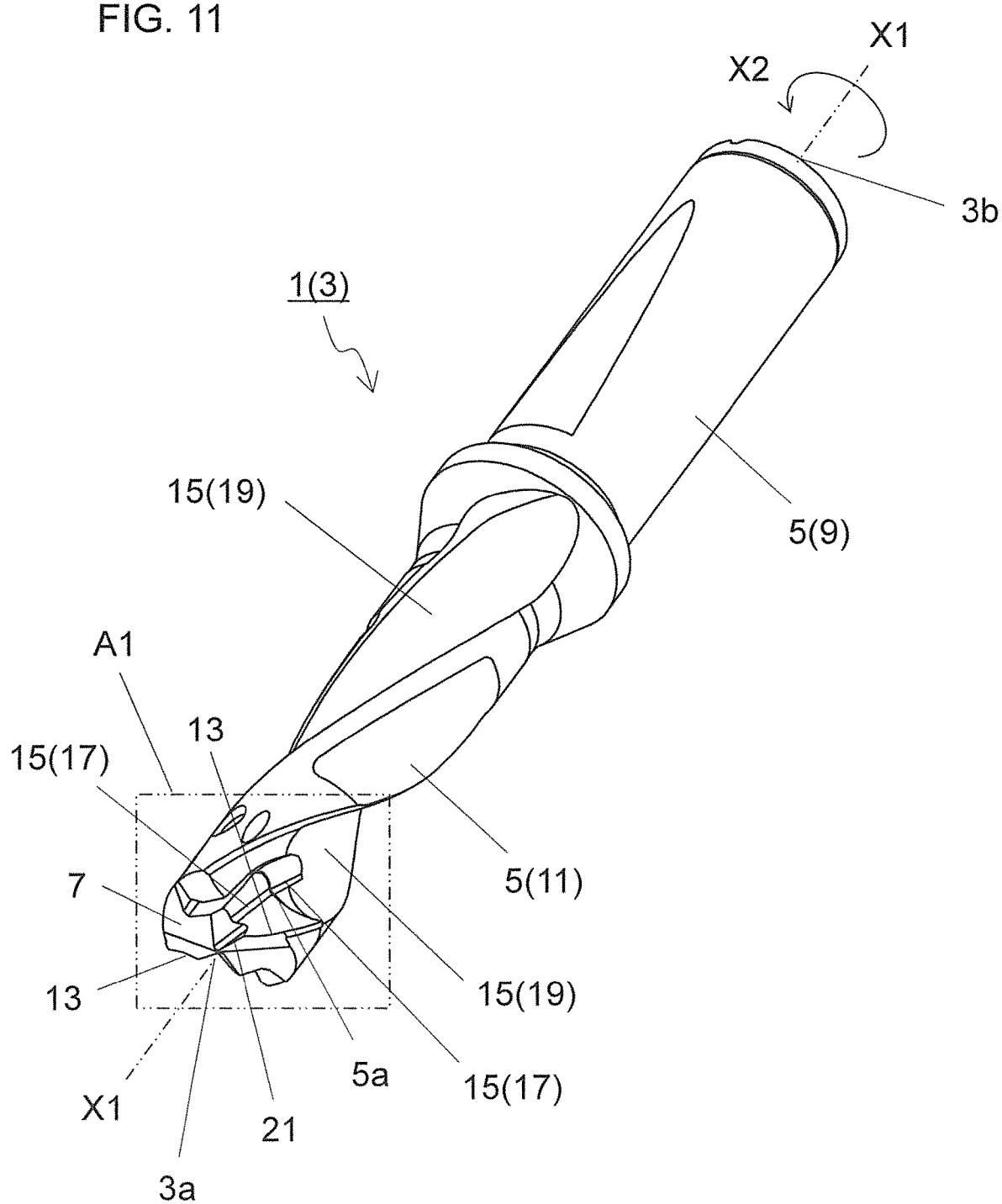
FIG. 11 is a perspective view of a non-limiting second modified embodiment of the drill illustrated in FIG. 1.

For example, as in a modified non-limiting embodiment illustrated in FIG. 10, parts of the flute 15 which are respectively formed at the insert 7 and at a portion on a side of the first end 3a in the holder 5 may correspond to the first flute 17, and a part formed at a portion on a side of the second end 3b in the holder 5 may correspond to the second flute 19. Alternatively, as in a modified non-limiting embodiment illustrated in FIG. 11, a part of the flute 15 which is formed at a portion on a side of the first end 3a in the insert 7 may correspond to the first flute 17, and a part formed at a portion on a side of the second end 3b in the insert 7 and a part formed on the holder 5 may correspond to the second flute 19.

However, manufacturing costs of the drill 1 may be reducible if the first flute 17 is formed on the insert 7 and the second flute 19 is formed on the holder 5. This may be because, even though the insert 7 and the holder 5 are usually manufactured separately, it may be possible to obtain such a configuration that the insert 7 includes only the first flute 17 and the holder 5 includes only the second flute 19. Specifically, it may be easy to form the flute 15 because it is unnecessary to obtain such a configuration that each of the insert 7 and the holder 5 includes both the first flute 17 and the second flute 19. It may be therefore possible to reduce the manufacturing costs of the drill 1.

The first portion 23 may be continuous with the second portion 25 in the first flute 17 or, alternatively, a portion connecting the first portion 23 and the second portion 25 may be interposed therebetween.

Shapes of the first portion 23 and the second portion 25 in the cross section orthogonal to the rotation axis X1 are not individually limited to a specific shape. For example, the first portion 23 and the second portion 25 may be made in the shape of a circular arc, elliptic arc or parabola. Alternatively, these shapes may be combined together.

If a maximum value of a radius of curvature of the first portion 23 is larger than a radius of curvature of the second portion 25 in the above cross section, it may be easy to ensure a large space for the first flute 17, and chip clogging may be therefore less likely to occur in the first flute 17.

The maximum value of a radius of curvature in the first portion 23 may be indicated by R1, and a maximum value of a radius of curvature in the second portion 25 may be indicated by R2. R1 may be set to, for example, approximately 0.5D to 1.5D. R2 may be set to, for example, approximately 0.2D to 0.8D. Unless otherwise noted, "the maximum value of the radius of curvature in the first portion 23" and "the maximum value of the radius of curvature in the second portion 25" may denote ones obtained by evaluating a radius of curvature in a cross section orthogonal to the rotation axis X1.

The maximum value R1 of the radius of curvature of the first portion 23 may be different or constant at different positions in the direction along the rotation axis X1. Chip clogging may be less likely to occur in a wide range of the first flute 17 if the maximum value R1 of the radius of curvature in the first portion 23 differs at different positions in the direction along the rotation axis X1, and the maximum value of a radius of curvature in the first portion 23 is larger than the radius of curvature in the second portion 25 in individual cross sections.

Chip flow variations in the first portion 23 can be minimized if the maximum value R1 of the radius of curvature in the first portion 23 is constant in cross sections at different position in the direction along the rotation axis X1. This may lead to a smooth chip flow in the first portion 23.

The maximum value R2 of the radius of curvature in the second portion 25 may be different or constant at different positions in the direction along the rotation axis X1. Chip curl variations in the second portion 25 can be minimized if the maximum value R2 of the radius of curvature in the second portion 25 is constant in cross sections at different positions in the direction along the rotation axis X1. Chip clogging may be therefore less likely to occur in the second portion 25.

In the non-limiting embodiment illustrated in FIGS. 7 and 8, the second portion 25 may include a first region located at a side of the first end 3a and a second region located closer to the second end 3b than the first region. FIG. 7 may illustrate a cross section orthogonal to the rotation axis in the first region. FIG. 8 may illustrate a cross section orthogonal to the rotation axis in the second region. In the non-limiting embodiment illustrated in FIGS. 7 and 8, a maximum value R2 of the radius of curvature in the second portion 25 in FIG. 7 may be smaller than a maximum value R2 of the radius of curvature in the second portion 25 in FIG. 8.

A chip flow direction may tend to be easily stabilized because chips are curled at a small radius of curvature in the first region relatively close to the cutting edge 13 because of a relatively small maximum value R2 in the first region located at a side of the first end 3a. A chip curling at an excessively small radius of curvature may be avoidable because the maximum value R2 in the second region relatively far away from the cutting edge 13 is relatively large. Chip clogging may be therefore less likely to occur.

In the non-limiting embodiment illustrated in FIGS. 7 and 8, the first flute 17 may further include a third portion 27 having a concave curvilinear shape including a bottom 17a, which is located between the first portion 23 and the second portion 25. A maximum value of a radius of curvature in the first portion 23 may be larger than a radius of curvature of the bottom 17a of the third portion in the cross section orthogonal to the rotation axis.

Chips generated by the cutting edge 13 may flow from the first portion 23 to the third portion 27. During the flow, the chips can be curled smoothly if the maximum value of the radius of curvature in the first portion 23 is larger than the radius of curvature on the bottom 17a in the third portion 27. Chip clogging may be therefore much less likely to occur in the first flute 17. Additionally, the durability of the first flute 17 may become enhanced because a load applied to the first portion 23 and the third portion 27 during passage of the chips tend to be dispersed.

If a maximum value of a radius of curvature in the third portion 27 is indicated by R3, R3 may be settable to, for example, approximately 0.05D to 0.3D.

Good chip discharge performance may be obtainable while enhancing the durability of the first flute 17 if a maximum value R2 of a radius of curvature in the second portion 25 is larger than a radius of curvature R3 on the bottom 17a in the third portion 27 and the maximum value R2 is also smaller than a maximum value R1 of a radius of curvature in the first portion 23.

Specifically, the second portion 25 may not become too large and it may be easy to ensure a large space for the first flute 17 if the maximum value R2 of a radius of curvature in the second portion 25 is larger than the radius of curvature R3 on the bottom 17a in the third portion 27. This may lead to good chip discharge performance in the first flute 17.

The second portion 25 may not become too small and it may be easy to ensure a thickness of the second portion 25 if the maximum value R2 of the radius of curvature in the second portion 25 is smaller than the maximum value R1 of a radius of curvature in the first portion 23. This may lead to enhanced durability of the first flute 17 because of enhanced durability of the second portion 25 when chips come into contact with the second portion 25.

In cases where the first flute 17 includes the first portion 23, the second portion 25 and the third portion 27, chips may tend to flow smoothly from the first portion 23 to the second portion 25 if the first portion 23, the second portion 25 and the third portion 27 connect to each other smoothly without any edge on boundaries between these regions.

The above phrase that "the first portion 23, the second portion 25 and the third portion 27 connect to each other smoothly" may not denote that strictly speaking, an edge may be present on neither a boundary between the first portion 23 and the third portion 27 nor a boundary between the third portion 27 and the second portion 25.

An angle formed by an extended straight line that imaginarily extends from the first portion 23 toward the third portion 27 and an extended straight line that imaginarily extends from the third portion 27 toward the first portion 23 may be 5° or less. An angle formed by an extended straight line that imaginarily extends from the second portion 25 toward the third portion 27 and an extended straight line that imaginarily extends from the third portion 27 toward the second portion 25 may be 5° or less.

Ratios of lengths of the first portion 23 and the second portion 25 in the cross section orthogonal to the rotation axis X1 may be constant or changed in the direction along the rotation axis X1. For example, if a comparison is made in terms of cross sections at different positions in the direction along the rotation axis X1, a length of the second portion 25 in a cross section at a side of the first end 3a may be smaller than a length of the second portion 25 in a cross section at a side of the second end 3b as in the non-limiting embodiment illustrated in FIGS. 7 and 8.

Specifically, FIG. 7 may illustrate the cross section orthogonal to the rotation axis X1 in the first region corresponding to a part of the first flute 17 which is located relatively at the side of the first end 3a. FIG. 8 may illustrate the cross section orthogonal to the rotation axis X1 in the second region corresponding to a part of the first flute 17 which is located relatively at a side of the second end 3b.

More specifically, the length of the second portion 25 in the first region may be smaller than the length of the second portion 25 in the second region in the non-limiting embodiment illustrated in FIGS. 7 and 8.

Enhanced chip discharge performance may be attainable if the second portion 25 includes the above configuration. This may be because of small variations in timing at which chips occurred on an outer peripheral side of the cutting edge 13 and chips occurred on a side of the rotation axis X1 of the cutting edge 13 come into contact with the second portion 25. The small variations in the timing may make it easier for the chips to stably curl spirally, thus leading to enhanced chip discharge performance.

Particularly in cases where the length of the second portion 25 in the cross section orthogonal to the rotation axis X1 becomes smaller as approaching the first end 3a, further enhanced chip discharge performance may be ensured. This may be because the variations in timing at which chips occurred on the outer peripheral side of the cutting edge 13 and chips occurred on the side of the rotation axis X1 of the cutting edge 13 come into contact with the second portion 25 can be further reduced if the length of the second portion 25 becomes smaller and the length of the first portion 23 becomes larger as approaching the first end 3a.

For example, the following evaluation may be made as to whether the length of the second portion 25 in the cross section orthogonal to the rotation axis X1 becomes smaller as approaching the first end 3a. The first step may be to determine at least four cross sections of the second portion 25, which are orthogonal to the rotation axis X1 so as to respectively include at least four points located at constant intervals in the direction along the rotation axis X1.

The next step may be to compare lengths of the second portion 25 in these cross sections. If the length of the second portion 25 is smaller in the cross section located closer to the first end 3a, an evaluation may be made so that the length of the second portion 25 in the cross section orthogonal to the rotation axis X1 becomes smaller as approaching the first end 3a.

There is no need to include the configuration that the length of the second portion 25 becomes smaller as approaching the first end 3a whereas the length of the first portion 23 becomes smaller as approaching the first end 3a in the cross section orthogonal to the rotation axis X1 as in the non-limiting embodiment illustrated in FIGS. 7 and 8. Alternatively, the length of the first portion 23 may be constant or become larger as approaching the first end 3a.

For example, with the configuration that the length of the first portion 23 in the cross section orthogonal to the rotation axis X1 becomes larger as approaching the first end 3a, it may be possible to further enhance chip discharge performance. With the configuration that the length of the second portion 25 becomes smaller as approaching the first end 3a, it may be possible to minimize the variations in timing at which the chips occurred on the outer peripheral side of the cutting edge 13 and the chips occurred on the side of the rotation axis X1 of the cutting edge 13 come into contact with the second portion 25. The above configurations may make it easier for the chips to stably curl spirally, thus leading to further enhanced chip discharge performance.

The above-mentioned length of the first portion 23 may denote a length of an imaginary straight line that connects both ends of the first portion 23 in the cross section orthogonal to the rotation axis X1. Similarly, the above-mentioned length of the second portion 25 may denote a length of an imaginary straight line that connects both ends of the second portion 25 in the cross section orthogonal to the rotation axis X1.

As described earlier, the flute 15 may include the first flute 17 and the second flute 19 in the non-limiting embodiment illustrated in FIG. 1. The second flute 19 may connect to the first flute 17 or, alternatively, may be located far away from the first flute 17.

If the second flute 19 connects to the first flute 17, the second flute 19 may smoothly connect to the first flute 17. Alternatively, the second flute 19 may be located on a more rear side in the rotation direction X2 than the first flute 17 as in the non-limiting embodiment illustrated in FIG. 2.

If the second flute 19 connects to the first flute 17 as described above, chips occurred on the cutting edge 13 may be less likely to caught in the vicinity of a boundary between the first flute 17 and the second flute 19 when the chips flow from the first flute 17 to the second flute 19. Particularly, if the second flute 19 is located on the more rear side in the rotation direction X2 than the first flute 17 in a region where the second flute 19 connects to the first flute 17 as described above, the chips may be much less likely to be caught in the vicinity of the boundary between the first flute 17 and the second flute 19.

In the non-limiting embodiment illustrated in FIG. 2, the second flute 19 may be located on the more rear side in the rotation direction X2 than the first flute 17 as described above, and a step may be disposed between the second flute 19 and the first flute 17.

The lengths of the first flute 17 and the second flute 19 in the direction along the rotation axis X1 are not limited to specific values. For example, the length of the first flute 17 in the direction along the rotation axis X1 may be D/4 to D.

If the length of the first flute 17 in the direction along the rotation axis X1 is D/4 or more, it may be easy to ensure a long length of the second portion 25 in the direction along the rotation axis X1. Consequently, chips can be stably brought into contact with the second portion 25 in the first flute 17, and the flute 15 may be therefore much less susceptible to damage.

If the length of the first flute 17 in the direction along the rotation axis X1 is D or less, it may be easy to ensure a large space for the second flute 19. This may suppress chips, after being curled by contact with the second portion 25, from repetitively coming into contact with the second portion 25 in the first flute 17 more than necessary, and the chips may tend to flow fast to the second flute 19, thereby further improving chip discharge performance.

Examples of materials of the insert 7 constituting the drill 1 may include cemented carbide and cermet. Examples of compositions of the cemented carbide may include WC—Co, WC—TiC—Co and WC—TiC—TaC—Co. Here, WC, TiC and TaC may be hard particles, and Co may be a binding phase.

The cermet may be a sintered composite material obtainable by compositing metal into a ceramic component. Specific examples of the cermet may include titanium compounds composed mainly of titanium carbide (TiC) or titanium nitride (TiN).

A surface of the insert 7 may be coated with a coating film by using, for example, chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

As a material for the holder 5 constituting the drill 1, for example, steel, cast iron or aluminum alloy may be usable. Steel may be preferred in terms of high rigidity in a non-limiting embodiment.

If the main body 3 is composed of a single member, the same material as the insert 7 may be usable as a material of the main body 3.

<Method for Manufacturing Machined Product>

A method for manufacturing a machined product in a non-limiting embodiment may be described in detail below by exemplifying the case of using the drill 1 in the foregoing non-limiting embodiments. The following description may be made with reference to FIGS. 12 to 14.

The method for manufacturing a machined product in the present non-limiting embodiment may include the following steps (1) to (4).

Figure 12:
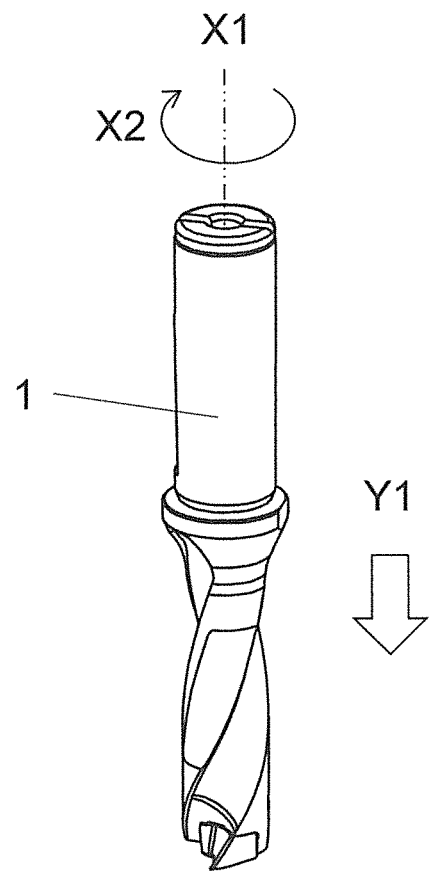
FIG. 12 is a schematic diagram illustrating one step in a method for manufacturing a machined product in a non-limiting embodiment.
Figure 12:
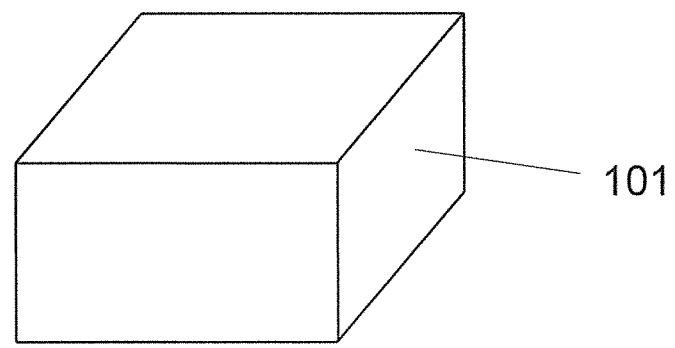

The step (1) may be to put the drill 1 above a prepared workpiece 101 (refer to FIG. 12).

Figure 13:
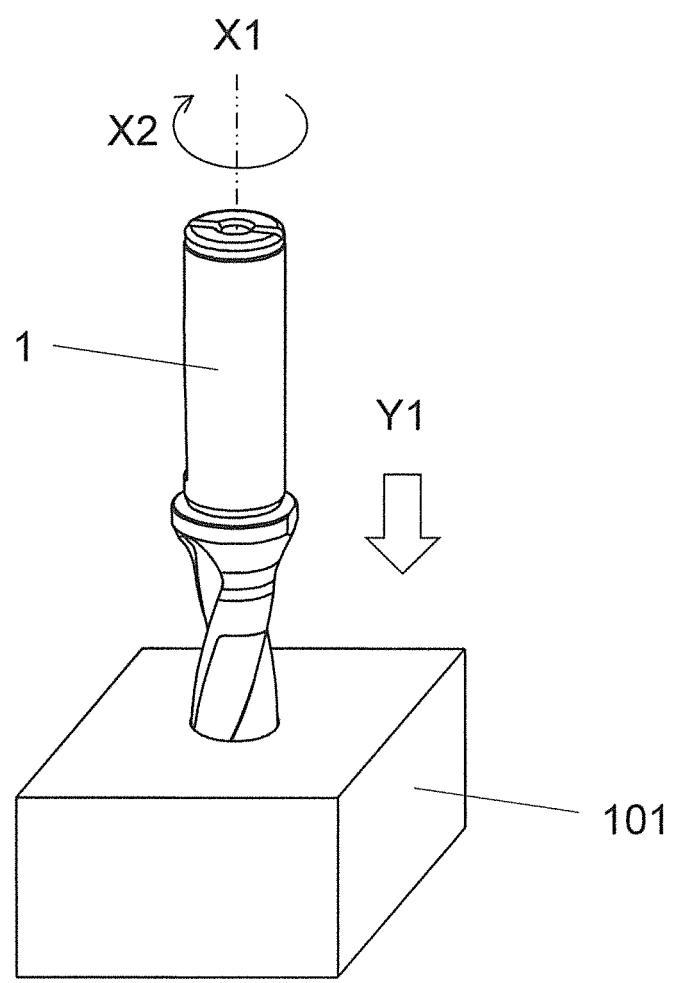
FIG. 13 is a schematic diagram illustrating one step in the method for manufacturing a machined product in the non-limiting embodiment.

The step (2) may be to bring the drill 1 near the workpiece 101 in Y1 direction by rotating the drill 1 in an arrow X2 direction around the rotation axis X1 (refer to FIGS. 12 and 13).

This step may be carried out by, for example, fixing the workpiece 101 onto a table of a machine tool with the drill 1 attached thereto, and then by bringing the drill 1 being rotated near the workpiece 101. In this step, the workpiece 101 and the drill 1 may be brought near each other. For example, the workpiece 101 may be brought near the drill 1.

The step (3) may be to form a drilled hole 103 (through hole) in the workpiece 101 by bringing the drill 1 nearer the workpiece 101 so that the cutting edge of the drill 1 being rotated is brought into contact with a desired position on a surface of the workpiece 101 (refer to FIG. 13).

In this step, from the viewpoint of obtaining a good machined surface, a setting may be made so that a portion of the body in the holder which is located at a side of the second end does not penetrate the workpiece 101. That is, the above portion may be servable as a margin region for chip discharge, and excellent chip discharge performance may be attainable through this region.

Figure 14:
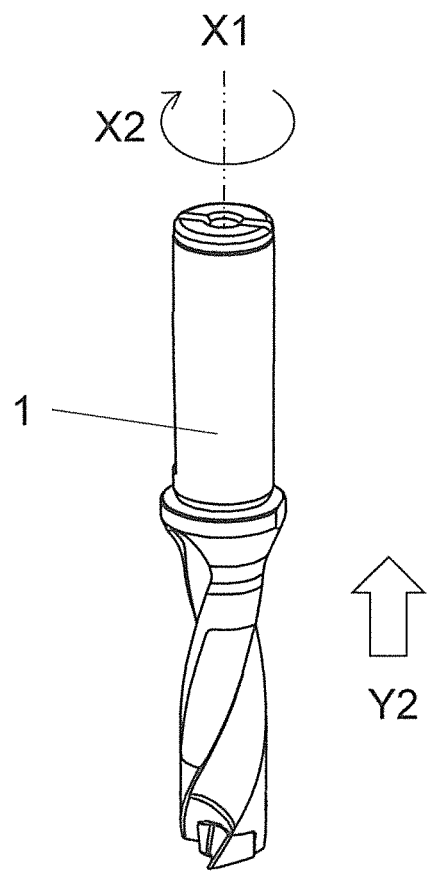
FIG. 14 is a schematic diagram illustrating one step in the method for manufacturing a machined product in the non-limiting embodiment.
Figure 14:
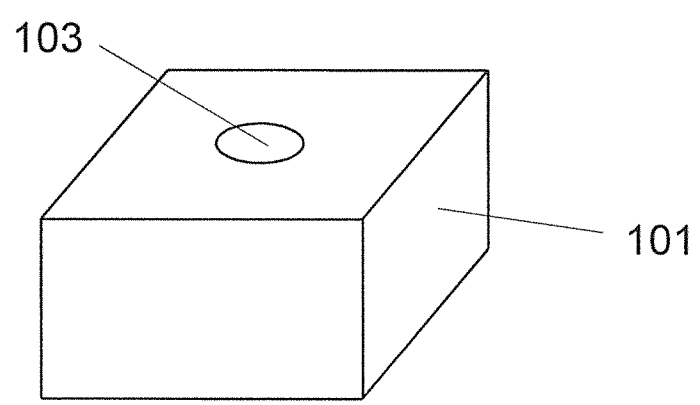

The step (4) may be to move the drill 1 away from the workpiece 101 in Y2 direction (refer to FIG. 14).

Also in this step, the workpiece 101 and the drill 1 may be kept away from each other as is the case with the above step (2). For example, the workpiece 101 may be moved away from the drill 1.

Excellent machinability can be provided through the foregoing steps.

If the cutting process of the workpiece 101 as described above is carried out a plurality of times, specifically for example, if a plurality of drilled holes 103 are formed in the single workpiece 101, bringing the cutting edge of the drill 1 into contact with different portions of the workpiece 101 while keeping the drill 1 rotating may be repeated.

While the drills 1 in the several non-limiting embodiments have been described and illustrated above, the present invention is not limited thereto. It may be, of course, possible to make any arbitrary ones insofar as they do not depart from the gist of the present invention.

DESCRIPTION OF REFERENCE NUMERALS 1 drill
3 main body
3a first end
3b second end
5 holder
5a pocket
7 insert
9 shank
11 body
13 cutting edge
15 flute
17 first flute
17a bottom
19 second flute
21 chisel edge
23 first portion
25 second portion
27 third portion
101 workpiece
103 drilled hole
   X1 rotation axis
   X2 rotation direction
   R1 radius of curvature in first portion
   R2 radius of curvature in second portion
   R3 radius of curvature on bottom

What is claimed is:

1. A drill, comprising:
a main body having a bar shape extending from a first end to a second end, the main body configured to rotate around a rotation axis, and comprising:
   a cutting edge located at a side of the first end,
   a first flute extending from the cutting edge toward the second end, and
   a second flute extending from the first flute toward the second end,
wherein
the first flute comprises a chip formation surface configured to smoothly curl chips, the chip formation surface comprising, in a first cross section orthogonal to the rotation axis,
   a first portion having a concave curvilinear shape located at a more rear side of the first flute in a rotation direction of the rotation axis than a bottom of the first flute, and
   a second portion having a convex curvilinear shape located at a more front side of the first flute in the rotation direction than the bottom of the first flute; and
the second flute has a concave curvilinear shape from a front end portion located at a front side of the second flute in the rotation direction to a rear end portion located at a rear side of the second flute in the rotation direction in a second cross section orthogonal to the rotation axis.

2. The drill according to claim 1, wherein
a maximum value of a radius of curvature in the first portion is larger than a maximum value of a radius of curvature in the second portion in the first cross section orthogonal to the rotation axis.

3. The drill according to claim 1, wherein
the first flute further comprises, in the first cross section orthogonal to the rotation axis, a third portion having a concave curvilinear shape which is located between the first portion and the second portion and comprises the bottom, and
a maximum value of a radius of curvature in the first portion is larger than a maximum value of a radius of curvature in the third portion in the first cross section orthogonal to the rotation axis.

4. The drill according to claim 3, wherein
a maximum value of a radius of curvature in the second portion is larger than the maximum value of the radius of curvature in the third portion.

5. The drill according to claim 1, wherein
the second portion comprises:
   a first region located at a side of the first end, and
   a second region located closer to the second end than the first region; and
a length of the second portion in the first cross section orthogonal to the rotation axis in the first region is shorter than a length of the second portion in a third cross section orthogonal to the rotation axis in the second region.

6. The drill according to claim 5, wherein
a length of the second portion in cross sections orthogonal to the rotation axis becomes shorter approaching the first end.

7. The drill according to claim 5, wherein
a maximum value of a radius of curvature of the second portion in the first region is less than a maximum value of a radius of curvature of the second portion in the second region.

8. The drill according to claim 1, wherein
the second flute is located at a more rear side of the main body in the rotation direction than the first flute in a region where the second flute connects to the first flute.

9. The drill according to claim 1, wherein
an outer diameter of the main body is indicated by D, and
a length of the first flute in a direction along the rotation axis is in a range of D/4 to D.

10. A method for manufacturing a machined product, comprising:
rotating the drill according to claim 1;
bringing the drill being rotated into contact with a workpiece; and
moving the drill away from the workpiece.

11. A drill, comprising:
a main body having a bar shape extending from a first end to a second end, the main body configured to rotate around a rotation axis, and comprising:
   a cutting edge located at a side of the first end,
   a first flute extending from the cutting edge toward the second end, and
   a second flute extending from the first flute toward the second end,
wherein
the first flute comprises a chip formation surface configured to smoothly curl chips, the chip formation surface comprising, in a first cross section orthogonal to the rotation axis,
   a first portion having a concave curvilinear shape located at a more rear side of the first flute in a rotation direction of the rotation axis than a bottom of the first flute, and
   a second portion having a convex curvilinear shape located at a more front side of the first flute in the rotation direction than the bottom of the first flute;
the second flute has a concave curvilinear shape from a front end portion located at a front side of the second flute in the rotation direction to a rear end portion located at a rear side of the second flute in the rotation direction in a second cross section orthogonal to the rotation axis; and
the second portion comprises:
a first region located at a side of the first end, and
a second region located closer to the second end than the first region; and
a length of the second portion along the convex curvilinear shape of the second portion in the first cross section orthogonal to the rotation axis in the first region is shorter than a length of the second portion along the convex curvilinear shape of the second portion in a third cross section orthogonal to the rotation axis in the second region.

12. The drill according to claim 11, wherein a length of the second portion in cross sections orthogonal to the rotation axis becomes shorter approaching the first end.

13. The drill according to claim 11, wherein
a maximum value of a radius of curvature of the second portion in the first region is less than a maximum value of a radius of curvature of the second portion in the second region.

14. The drill according to claim 11, wherein a maximum value of a radius of curvature in the first portion is larger than a maximum value of a radius of curvature in the second portion in the first cross section orthogonal to the rotation axis.

15. The drill according to claim 11, wherein the first flute further comprises, in the first cross section orthogonal to the rotation axis, a third portion having a concave curvilinear shape which is located between the first portion and the second portion and comprises the bottom, and a maximum value of a radius of curvature in the first portion is larger than a maximum value of a radius of curvature in the third portion in the first cross section orthogonal to the rotation axis.

16. The drill according to claim 15, wherein
a maximum value of a radius of curvature in the second portion is larger than the maximum value of the radius of curvature in the third portion.

17. The drill according to claim 11, wherein
the second flute is located at a more rear side of the main body in the rotation direction than the first flute in a region where the second flute connects to the first flute.

18. The drill according to claim 11, wherein
an outer diameter of the main body is indicated by D, and
a length of the first flute in a direction along the rotation axis is in a range of D/4 to D.

19. A method for manufacturing a machined product, comprising:
rotating the drill according to claim 11;
bringing the drill being rotated into contact with a workpiece; and
moving the drill away from the workpiece.

20. A drill, comprising:
a main body having a bar shape extending from a first end to a second end, the main body configured to rotate around a rotation axis, and comprising:
a holder, and
an insert attached to the holder at a side of the first end; wherein
the insert comprises:
a cutting edge located at a side of the first end, and
a first flute extending from the cutting edge toward the second end; and
the holder comprises:
a second flute extending from the first flute toward the second end;
wherein
the first flute comprises a chip formation surface configured to smoothly curl chips, the chip formation surface comprising, in a first cross section orthogonal to the rotation axis,
a first portion having a concave curvilinear shape located at a more rear side of the first flute in a rotation direction of the rotation axis than a bottom of the first flute, and
a second portion having a convex curvilinear shape located at a more front side of the first flute in the rotation direction than the bottom of the first flute; and
the second flute has a concave curvilinear shape from a front end portion located at a front side of the second flute in the rotation direction to a rear end portion located at a rear side of the second flute in the rotation direction in a second cross section.

* * * * *